Figure 1:
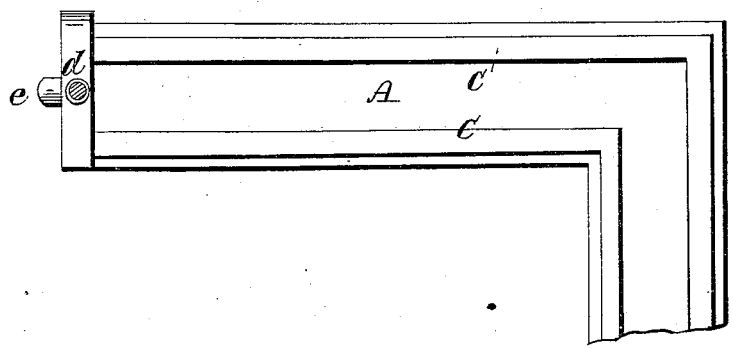
Figure 2:
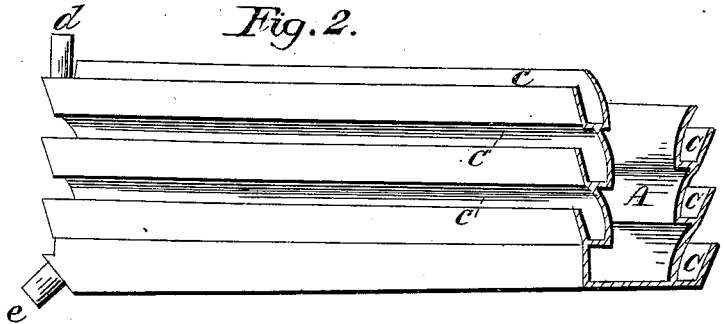

H. HIEMENZ.
Beer Cooler.

No. 77,732.

Patented May 12, 1868.

WITNESSES:

INVENTOR:

United States Patent Office.

NICHOLAS HIEMENZ, OF BUFFALO, NEW YORK.

Letters Patent No. 77,732, dated May 12, 1868.

IMPROVED BEER-COOLER.

*The Schedule referred to in these Letters Patent and making part of the same.*

TO ALL WHOM IT MAY CONCERN:

Be it known that I, NICHOLAS HIEMENZ, of the city of Buffalo, county of Erie, and State of New York, have invented a new and improved Beer-Cooler; and I do hereby declare that the following is a full, clear, and exact description thereof, reference being had to the accompanying drawings, making a part of this specification, in which—

Figure I is a sectional elevation.

Figure II is a plan view.

The nature of this invention consists in an open inclined trough, formed around the outside walls of an ice-chamber, the pitch of the trough being such as to allow the beer discharged therein to flow slowly in said trough, and around said ice-chamber, down to the bottom, and, by its contiguity with the ice-chamber, become rapidly cooled.

Letters of like name and kind refer to like parts in each of the figures.

A represents an ice-chamber, which may be of any convenient form. It is made open at the top, so that it can be easily filled with water and ice.

C represents a continuous open trough, formed around and contiguous to the outside of this ice-chamber.

The beer is led into the trough by the feed-pipe $d$.

The inclination or pitch of the trough may be made greater or less, according to the height of the chamber or the velocity with which the beer is designed to flow.

At the lower end of the trough, a discharge-pipe, $e$, is connected, which communicates with receiving-tanks.

The object and advantages of my invention may be briefly stated, as follows:

The present way of cooling beer after it is made, and previous to its being stored away in the cellars, consists in exposing it to the air in large, flat tanks, but the degree of temperature to which the beer may be reduced by this means depends entirely on the state of the atmosphere, so that in winter the process is easily and quickly performed, while in hot summer days the manufacture of beer is almost impossible. Thus any device for facilitating and accelerating the cooling process must be of great importance and usefulness in the manufacture of beer.

My improvement is intended to perform the cooling process in shorter time and with greater facility than any other means heretofore known or used.

The ice-chamber is first filled with water, and a sufficient quantity of ice put therein to reduce its temperature to a great extent, so that the walls of the chamber are rendered cold.

The beer is then led, through the pipe $d$, into the open trough C, and commences its slow descent around the ice-chamber to the bottom, from whence it is discharged through the pipe $e$. By this means the temperature of the beer may be reduced to 50° in a much shorter time than the atmosphere is able to cool it to about 100° or 120° in as long time as a day or day and a half.

The shape or construction of the cooler, as shown in the drawings, may be modified considerably, without departing from the principle of my invention.

The superficial dimensions and shape of the ice-box may be round, oval, oblong, or square, according to the room in which it is to be placed or the space it is to occupy. The cross-section of the trough may be made rectangular, semicircular, or triangular, as will be found expedient.

What I claim as my invention, and desire to secure by Letters Patent, is—

A beer-cooler, composed of an ice-chamber, A, having an open inclined trough, C, formed upon the outside walls thereof, in the manner and for the purpose substantially as herein described.

N. HIEMENZ.

Witnesses:
    B. H. MUEHLE,
    GEO. R. ALLEN.